Aug. 11, 1970     R. L. DREYER     3,523,382

VARIABLE PICTURE FRAME ASSEMBLY

Filed July 18, 1968     2 Sheets-Sheet 1

INVENTOR:
Ronald L. Dreyer
Carlos A. Torres
ATTORNEY

Aug. 11, 1970  R. L. DREYER  3,523,382
VARIABLE PICTURE FRAME ASSEMBLY
Filed July 18, 1968  2 Sheets-Sheet 2

INVENTOR:
Ronald L. Dreyer
Carlos A. Torres
ATTORNEY

United States Patent Office 3,523,382
Patented Aug. 11, 1970

3,523,382
VARIABLE PICTURE FRAME ASSEMBLY
Ronald L. Dreyer, Rte. 2, Shiner, Tex. 77984
Filed July 18, 1968, Ser. No. 745,857
Int. Cl. G09f 1/12
U.S. Cl. 40—152
10 Claims

ABSTRACT OF THE DISCLOSURE

Individual frames are provided with hooks or clamps which cooperate with holes or slots respectively in similar frames to secure adjacent frames together in various arrangements. A photograph, glass and backing are retained in position within the individual frames by an integrally formed, resilient clip which extends from one edge of the frame. Several smaller frames are displayed independently or are mounted within a single larger frame.

BACKGROUND OF THE INVENTION

Field of the invention

The present invention relates to the art of picture framing and display. More particularly, the present invention relates to a frame assembly which may be arranged in a variety of combinations or as a single unit.

Description of the prior art

Various frame assemblies are known in the prior art. By way of example, the patent to Leigh 2,737,742 discloses a sectional cardboard display device which permits several individual frames to be assembled in a variety of groupings. Each individual frame is equipped with an easel-type support means to permit the frame to be self-supporting on a flat surface. Locking jaws are included in the Leigh assembly to secure similar frames to each other to create a composite display.

One significant limitation present in the Leigh assembly is the absence of means for removably mounting a picture and protective glass covering within the frame. This omission in the construction of the Leigh frame limits its use to displays which are secured to the surrounded area within the frame in a relatively permanent manner. As an inherent result of the Leigh construction, there is also an absence of means for covering the edges of the photograph or other subject matter with the sides of the framework and no means are provided for accommodating various thicknesses of display material. For these reasons, modification of the Leigh device would appear to be required before decorative display matter could be easily displayed or interchanged within a frame.

It is also desirable to mount individual frames in such a manner that an assembly of several of the frames would present an appearance of an integral unit. This effect is lacking when individual frames are simply secured to each other where the emphasis is placed on the individuality of each of the component frames rather than on the combination of frames.

Another picture frame assembly related to the field of decorative wall hangings rather than advertising displays is disclosed in the patent to Henderson et al. 3,070,914. The Henderson et al. assembly also includes means for securing similar frames to each other in a variety of groupings. Adjacent frames in the assembly are secured to each other by resilient clips which engage both of the rear edges of two adjoining frames. Each individual frame is equipped with several removable clips which are required for mounting a picture in the frame. The use of such separate clips is undesirable in that they are subject to separation from the frame and may eventually be lost. Moreover, if the separate clips are loosened, the photographs may become displaced within the frame.

A grouping of two frames of the type disclosed by Henderson et al. requires a minimum of 11 separate components. The required components include two frames, four picture holding clips for each of the two frames (a total of eight) and a minimum of one resilient clip to secure the two frames to each other. As with the Leigh assembly, the Henderson et al. frame assembly lacks any means for unifying a grouping of the individual frames.

U.S. Pat. No. 415,713 to Gilbert discloses a frame assembly which provides a unified grouping of individual, framed photographs. However, the individual photographs in the Gilbert assembly cannot be mounted separately and the total number of required components for the grouping is relatively large.

Other prior art assemblies such as the assemblies disclosed in Zareko 2,317,708 and Mallory 3,339,302, which include locking means for securing adjacent frames to each other are objectionable in that the locking means are visible at the edges of the frames.

Brief summary of the invention

The present invention includes individual frames which are designed to be displayed either singly or in groupings of two or more. The individual frames are also adapted to be mounted in a variety of arrangements within a larger frame to provide a unified display.

In one form of the invention, the individual frames may be secured to each other in groups of two or more without the need for separate locking means. Moreover, each frame includes integrally formed means for holding a photograph, protective glass covering and backing in place. As a result, only two components are required in a grouping of two photographs as compared with eleven separate pieces required by the Henderson et al. assembly for a similar grouping. Another form of the present invention employs separable clips for securing adjacent frames together which results in a total of three separate components for a grouping of two frames. The reduction in the number of required parts for a group display obviously results in reduced production costs and also reduces the possibility of loss of the smaller components. Moreover, the means employed in the present invention for holding the protective glass, photograph and backing in place are adapted to hold variable thicknesses of glass, photograph and backing with a constant retaining force. This prevents the photograph from being displaced or loosened in its mounting so that the material displayed remains in place even in situations where the frame is handled roughly.

DESCRIPTION OF THE PREFERRED EMBODIMENTS

Figure 1:
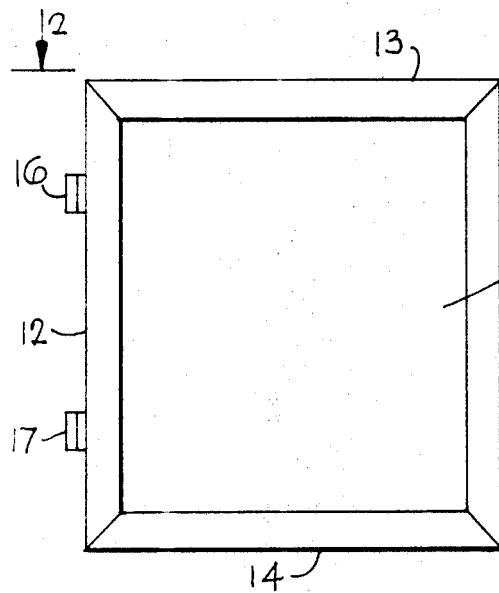
FIG. 1 of the drawings illustrates a plan view of an individual frame employed in the preferred form of the present invention.

FIG. 1 of the drawings illustrates the preferred form of an individual frame indicated generally at 10. The frame 10 includes vertically extending side members 11 and 12 and horizontally extending side members 13 and 14. The sides 11, 12, 13 and 14 enclose a display area 15 which may exhibit a photograph or any other desired display.

Figure 2:
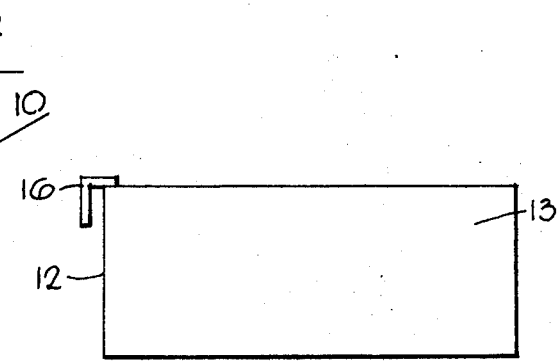
FIG. 2 of the drawings is an overhead view taken along the line 2—2 of FIG. 1.

The side member 12 of the frame 10 is equipped with integrally formed locking pins 16 and 17. As best illustrated in FIG. 2 of the drawings, the locking pins 16 and 17 are secured to the back surface of the side member 12 and extend parallel to the outer side surface toward the front surface of the member 12.

Figure 3:
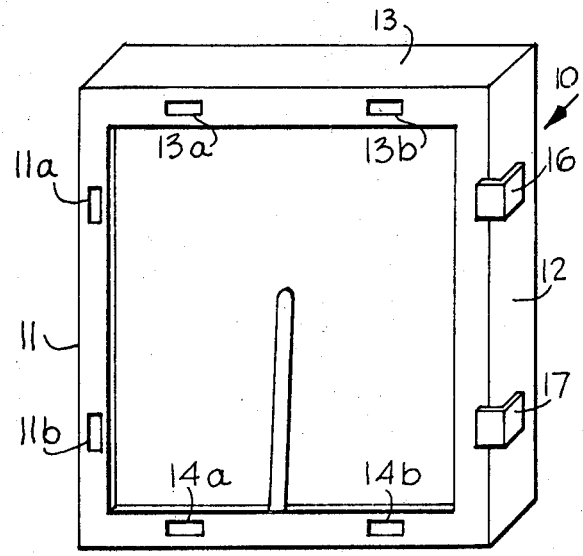
FIG. 3 of the drawings is a perspective rear view of the frame illustrated in FIG. 1.

FIG. 3 of the drawings illustrates the preferred form of the individual frame 10 as seen in perspective from the rear. The back surfaces of the sides 11, 13 and 14 are provided with mounting bores 11a, 11b, 13a, 13b, 14a and 14b as illustrated which are adapted to receive the locking pins of adjacent frames.

The arrangement of the mounting bores and locking pins on each of the individual frames is varied to permit the display of two or more of the individual frames without exposing any of the locking pins at the outer side surfaces of the resulting groupings. This feature may best be understood by reference to FIG. 4 of the drawings which is a rear view of a group of twelve frames designated A–L. The twelve frames A–L are mounted within a single large frame 18, with adjacent frames being locked together by engagement of the locking pins of one frame with the corresponding mounting bores of the adjacent frame. Any suitable means may be employed for holding the individual frames within the larger frame 18. By way of example rather than limitation, the individual frames may be provided with additional locking pins for engagement with the mounting bores provided in the back surface of the side members forming the large frame 18.

Figure 4:
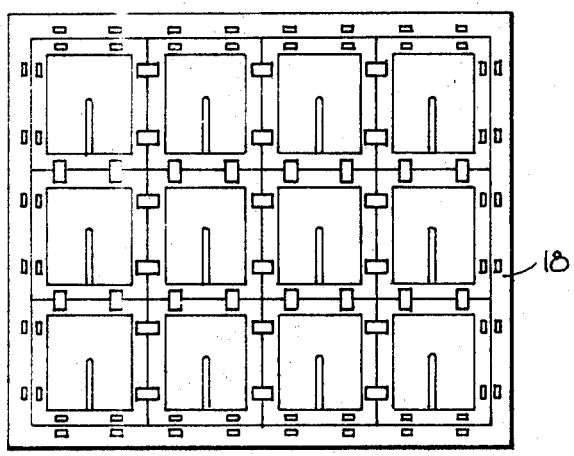
FIG. 4 of the drawings is a plan view of the rear of a complete assembly of a plurality of the individual frames mounted in a larger frame.

The twelve individual frames illustrated in FIG. 4 of the drawings may be classified within one of four constructions. Thus, frames A, B and C are all of the same construction; frames E, F, G, H, I, J, and K are of the same construction; frames H and L form a third construction; and frame D forms the fourth construction. Each of the frames within a given construction have the same arrangement of locking pins and mounting bores. It is also desirable that the spacing of the mounting bores and hooks along the outer side surfaces of the frames be spaced to permit the two pins of one frame to engage the lower bore of a second frame and the upper mounting bore of a third frame. This feature permits staggering of adjacent frames and increases the number of possible groupings.

The types of construction and the number of frames having a given construction may also be varied as desired. Preferably, the positioning of pins and slots should be selected to permit two or more of the frames to be arranged in groupings having no locking hooks exposed at the outer side surfaces of the grouping. As an example of this feature, it may be observed that certain of the frames illustrated in FIG. 4 of the drawings may be displayed independently of the large frame 18 without exposing any locking pins. Thus, without altering the relative positions of the individual frames, the following groupings as well as others would have no locking hooks exposed along the outer side surfaces of the groupings: A, B, C, D; A, B, C, D, E, F, G, H; or the preceding combinations with frame L or frames L and K or frames L, K and J; D; D, H; D, H, L; C, D.

Figure 6:
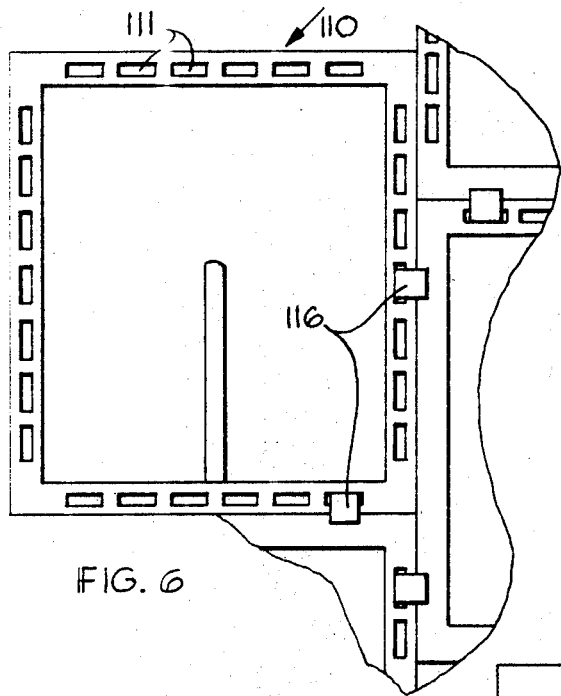
FIG. 6 of the drawings is a cutaway rear plan view of a second form of the individual frames of the present invention.

FIG. 6 of the drawings illustrates a rear view of a second form of the individual frames of the present invention. The individual frame indicated generally at 110 includes a series of mounting slots 111 opening in the back surface of the frame member. The slots 111 serve the function of the bores which are employed in the first form of the invention. The side members of the frame 110 carry locking pins 116 which are similar to the pins 16 and 17 in the frame illustrated in FIG. 1 of the drawings. The pins 116 are inserted into the slots 111 to secure adjacent frames to each other. The arrangement of pins and slots illustrated in FIG. 6 permits adjacent frames to be staggered or offset over a relatively large segment of the frame side member, thereby affording a greater variety of possible groupings.

Figure 7:
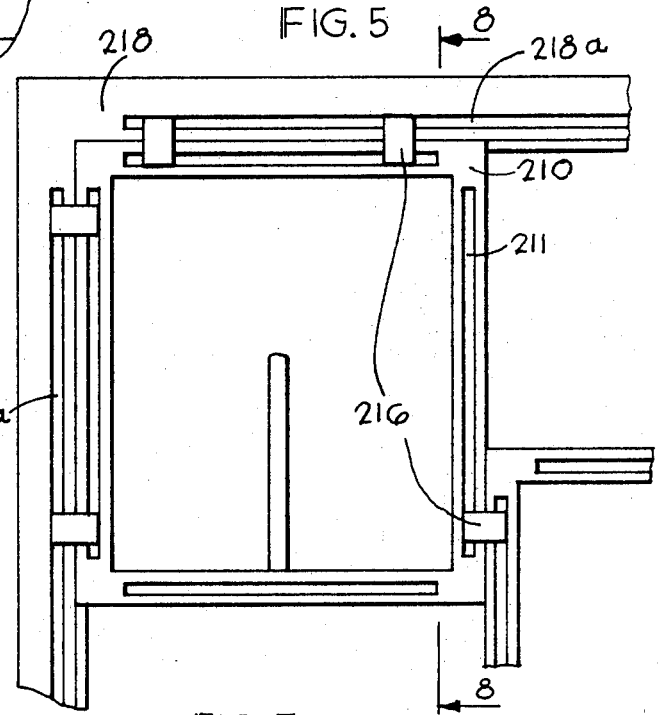
FIG. 7 of the drawings is a cutaway rear plan view of a third form of the present invention illustrating the mounting of individual frames in a larger frame.

FIG. 7 of the drawings illustrates a rear view of a third form of the present invention. An individual frame 210 is provided with elongated slots 211 along the back surface of each of its four side members. Adjacent frames are secured to each other by means of clips 216 which engage the slots in the adjoining side members of the two frames. The clips 216 are also employed to secure the individual frames 210 to a larger frame 218. For this purpose, slots 218a are formed in the back surface of the side members of the larger frame 218.

Figure 9:
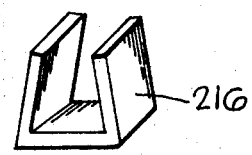
FIG. 9 of the drawings illustrates a clip employed in securing the frames in the third form of the present invention.

FIG. 9 of the drawings illustrates the construction of the clips 216. The clip 216 is preferably U-shaped and constructed of a sturdy resilient material. The legs of the clip 216 are slightly closed toward each other to afford good frictional engagement with the slots in the adjacent side members of adjoining frames. In applying the clip 216 to the frames, the legs of the clip are forced open and inserted into the slots formed in the back side surface of adjoining frames. The resiliency of the clip draws the two frames together to effect a secure bond.

Figure 8:
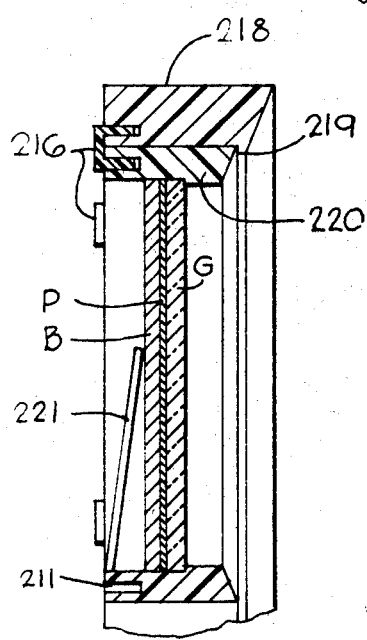
FIG. 8 of the drawings is a cross sectional view of the third form of the present invention taken along the line 8—8 of FIG. 7.

The construction of the individual frame 210 may best be described by reference to FIG. 8 of the drawings. It should be noted that the construction of the frame 210 is similar to the first and second forms of the frames 10 and 110 with the exception of the locking hooks and mounting bores or slots. A shoulder 220 is formed along the inner side surface of the side member of the frame 210 for mounting the display material contained within the frame. The larger frame 218 is also provided with an interior shoulder 219 formed along the inner side surface of the side members which engages and retains the outer edges of the individual frames 210. The side members of the large frame 18 illustrated in FIG. 4 of the drawings are also provided with similar shoulders along their inner side surface for mounting of the smaller frames.

With reference again to FIG. 8 of the drawings, a protective glass covering G, photograph P and backing B are held against the shoulder 220 by a resilient clamp 221. The base of the clamp 221 is rigidly secured to the lower side member and is biased to press against the display material. The display material may be inserted, removed or adjusted by pulling against the force of the clamp 221. The resiliency and construction of the clamp 221 permit mounting of various thicknesses of display materials within the frame 220.

Figure 5:
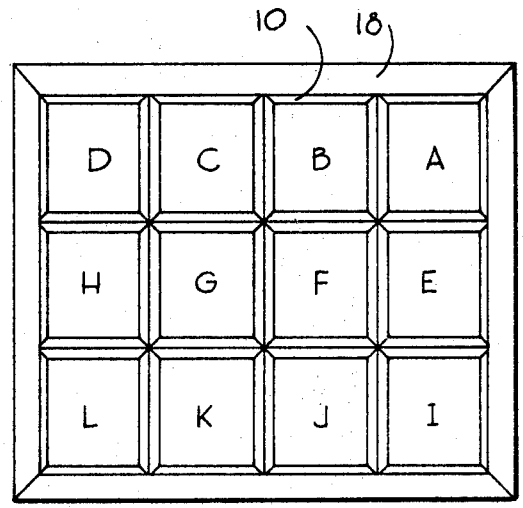
FIG. 5 of the drawings is a front plan view of the assembly illustrated in FIG. 4 of the drawings.

A front view of a complete frame assembly is illustrated in FIG. 5 of the drawings. An assembly of any of the forms of the frames described herein would have the same appearance. It should be appreciated that less than all of the individual frames may be exhibited within the large frame. Thus, by way of example, frames A, B, C, D, H, and L may be displayed in the frame 18 with the remaining frames omitted. This grouping would also leave no locking pins exposed when the first or second form of the individual frames are used.

While any material would be suitable, it is preferable that all of the components of the frame assembly be constructed of a suitable plastic. This permits the application of molding techniques for large scale manufacturing purposes. Where such techniques are applied, the clip 221 may desirably be constructed as a separate component with suitable means provided in the bottom side member of the frame for removably receiving the base of the clip. By separate fabrication of a removable clip, the cost of molding the frame components may often be significantly reduced.

The foregoing disclosure and description of the invention is illustrative and explanatory thereof, and various changes in the size, shape, and materials as well as in the details of the illustrated construction may be made within the scope of the appended claims without departing from the spirit of the invention.

I claim:
1. A frame assembly comprising:
   (a) a plurality of first frames, each of each first frames having four side members forming an enclosed area between said side members for containing display material;
   (b) each of said side members having a front surface, a back surface, an inner side surface and an outer side surface;
   (c) locking means for securing said first frames to each other;
   (d) said first frames including retaining means for retaining the display material within said enclosed area of said first frame; and
   (e) a second frame having four side members for removably containing said first frames.
2. The frame assembly defined in claim 1 wherein said retaining means includes;
   (a) an integrally formed clamp extending from one of said side members of said first frame toward the enclosed area within said first frame; and
   (b) said clamp being constructed of a resilient material and biased toward the enclosed area of said first frame for removably retaining the display material in said first frame.
3. The frame assembly as defined in claim 2 wherein said first frames include a shoulder formed on said inner side surfaces of each of said four side members for engaging the edges of the display material contained within said first frames.
4. The frame assembly defined in claim 3 wherein said locking means includes;
   (a) a plurality of mounting bores opening on the back surface of said side members of said first frames;
   (b) a plurality of locking hooks extending from the side members of said first frames; and
   (c) said locking hooks and said mounting bores of one of said first frames adapted to engage the locking hooks and mounting bores of another of said first frames.
5. The frame assembly as defined in claim 3 wherein said locking means includes:
   (a) a plurality of mounting slots opening on the back surface of said side members of said first frames;
   (b) a plurality of locking hooks extending from said side members of said first frames; and
   (c) said locking hooks and said mounting slots of one of said first frames adapted to engage the locking hooks and mounting slots of another of said first frames.
6. The frame assembly as defined in claim 3 wherein said locking means includes:
   (a) an elongated slot opening on the back surface of each of said four side members of said first frames, said elongated slot extending substantially the entire length of said side member;
   (b) an elongated slot formed in each of the said four side members of said second frame; and
   (c) a U-shaped clip means for engaging the elongated slots in each of two adjacent side members of said first frames or of one of said first frames and said second frame.
7. The frame assembly as defined in claim 3 wherein:
   (a) each of said side members of said second frame have an inner side surface; and
   (b) a shoulder is formed along said inner side surface of said side members of said second frame for engagement with the front surface of said side members of said first frames.
8. The frame assembly as defined in claim 7 wherein said locking means includes:
   (a) a plurality of mounting bores opening on the back surface of said side members of said first frames;
   (b) a plurality of locking hooks extending from the side members of said first frames; and
   (c) said locking hooks and said mounting bores of one of said first frames adapted to engage the locking hooks and mounting bores of another of said first frames.
9. The frame assembly as defined in claim 7 wherein said locking means includes:
   (a) a plurality of mounting slots opening on the back surface of said side members of said first frames;
   (b) a plurality of locking hooks extending from said side members of said first frames; and
   (c) said locking hooks and said mounting slots of one of said first frames adapted to engage the locking hooks and mounting slots of another of said first frames.
10. The frame assembly as defined in claim 7 wherein said locking means includes:
    (a) an elongated slot opening on the back surface of each of said four side members of said first frames, said elongated slot extending substantially the entire length of said side member;
    (b) an elongated slot formed in each of the said four side members of said second frame; and
    (c) a U-shaped clip means for engaging the elongated slots in each of two adjacent side members of said first frames or of one of said first frames and said second frame.

References Cited

UNITED STATES PATENTS

| | | | |
|---|---|---|---|
| 501,262 | 7/1893 | Walker | 40—152.1 |
| 540,011 | 5/1895 | Wiederer | 40—152.1 |
| 873,050 | 12/1907 | Itler | 40—152.1 |
| 2,737,742 | 3/1956 | Leigh | 40—125 |
| 3,070,914 | 1/1963 | Henderson et al. | 40—156 |

EUGENE R. CAPOZIO, Primary Examiner

W. J. CONTRERAS, Assistant Examiner

U.S. Cl. X.R.

40—125